Patented June 4, 1940

2,203,441

UNITED STATES PATENT OFFICE 2,203,441

WATER-SOLUBLE AND OIL-SOLUBLE SULPHONIC OR SULPHATE DERIVATIVES OF HYDROCARBONS

Thomas C. Oliver, Jackson Heights, N. Y., assignor to Charlotte Chemical Laboratories, Inc., Charlotte, N. C., a corporation of North Carolina No Drawing. Application November 25, 1938,
Serial No. 242,190

6 Claims. (Cl. 260—504)

The present invention relates to sulphonic or sulphate derivatives of hydrocarbons which are soluble not only in oil but also in water and having organic sulphur combined with hydrocarbons in excess of inorganic sulphur combined with metallic alkalies. Thus, the term "inorganic sulphur" relates to those components of a dispersant such as described hereinabove in which the sulphur is joined to inorganic atoms entirely. An example of such "inorganic sulphur" is the sulphur of sodium sulphate. On the other hand, I use the term "organic sulphur" to classify the sulphur present in alkyl sulphonates and sulphates and the like. Similarly, the class name, "substituted sulphuric acids" designates the alkyl, aryl or aralkyl sulphuric acids.

Heretofore, sulphonic derivatives of hydrocarbons, for example, the sulphonic derivatives of the hydrocarbons of petroleum oil, have been obtained by employing liquid sulphuric acid or flashed oleum. Consequently, such prior art products have contained inorganic sulphur in excess of organic sulphur.

It is an object of the present invention to provide sulphonic derivatives of hydrocarbons in which the organic sulphur is in excess of the inorganic sulphur.

It is another object of the present invention to provide sulphonic derivatives of hydrocarbons in which the organic sulphur is in excess of the inorganic sulphur that are capable of forming oil-in-water emulsions in which the oil particles show Brownian movement.

It is a further object of the present invention to provide sulphonic derivatives of hydrocarbons in which alkyl sulphates and alkyl sulphonic esters are in excess of inorganic salts of sulphur.

Other objects and advantages will become apparent to those skilled in the art from the following description of the present invention.

I have discovered that sulphonic acids of organic materials such as mineral oils, mineral oil fractions and the like, or mixtures of mineral oils, and/or mineral oil fractions with vegetable and/or animal oils and fats and/or coal tar products can be produced in a manner which involves control of the composition of the product, resulting in a standardized product containing organic sulphur in excess of alkali metal sulphates, especially sodium sulphate, and capable of forming true emulsions of the oil-in-water type.

In general, I have found that a selective sulphonation and sulphation of mineral oils, mineral oil fractions, and mixtures of mineral oils and/or mineral oil fractions with vegetable and/or animal oils and/or fats and/or coal tar products and the like, for example, may be secured by carefully controlling the temperature of the reaction, the time of contact of reactants, the concentration of the reactants and by ensuring that the moisture content of the reactants (preferably anhydrous) approaches a small or negligible quantity. This is contrary to general practice in the oil industry where a certain uncontrolled sulphonation and sulphation are utilized for the purpose of removing impurities from the various fractions of the oil in the production of a marketable product from the acid washed oil. It has been common practice for operators in the oil industry to wash out the unsaturates from various oil fractions by treating the oil with sulphuric acid of varying strengths including oleum. The concentration and quantity of acid employed was solely dependent upon the amount of unsaturates and other impurities which it was necessary to remove from the oil to meet the trade specifications. The heterogeneous mass secured as a by-product of this washing operation is of variable composition, differing from day to day depending upon the crude stock used, naturally contains combined sulphuric acid in the form of alkali metal sulphates in excess of organic sulphur after the mass has been neutralized and may be either oil-insoluble or oil-soluble.

On the other hand, by my improved method of selective sulphonation and sulphation, I intentionally produce compounds which are both water- and oil-soluble, substituted sulphuric acids, sulphonic acids or alkali salts of substituted sulphuric acids and/or sulphonic acids of substantially constant composition, standardized to be the same from day to day and capable of forming true oil-in-water emulsions. These true oil-in-water emulsions have an extremely low surface tension, and contain alkaline sulphonates, alkyl sulphates and alkyl sulphonic esters in excess of sulphuric acids or alkali metal sulphates. In sulphonating in my process, not only are the sulphonic groups produced, but also the esters of the higher hydrocarbons and, upon hydrolysis, alcohols.

I have found that by carrying out the sulphonation with sulphuric anhydride, particularly in the anhydrous state and substantially devoid of sulphuric acid, the reaction may be controlled and caused to progress smoothly at practically constant reaction velocity and at readily controlled temperatures and that the time of contact of the reactant may be regulated within critical limits to produce a uniform product.

The sulphuric anhydride may be generated in any suitable manner. For instance, sulphuric anhydride may be generated from sulphurous anhydride which is oxidized to dry sulphuric anhydride at suitable temperatures in the presence of a suitable catalyst. Furthermore, sulphuric anhydride so produced contains a small quantity of sulphurous anhydride which I have found of great benefit in bringing about my satisfactory results. In the past, efforts have been made to treat oils with sulphuric anhydride obtained from oleum or the flashing of oleum. It has not been possible to secure in this manner a vapor sufficiently dry and devoid of moisture and entrained sulphuric mist to produce the results obtained in my invention. When oleum is used directly, the free $SO_3$ is utilized but the residual liquid sulphuric acid is very detrimental. When oleum is flashed in customary industrial equipment it is not commercially feasible to avoid the formation of entrained acid or acid mist. My invention is primarily based on the utilization of an extremely dry or anhydrous sulphur trioxide substantially devoid of liquid sulphuric acid, entrained acid or acid mist.

The gases from the converter substantially devoid of sulphuric acid and water may be mixed with an inert gas, say dry air, and then passed through the mass or charge of organic material to be sulphonated at a rate which is controlled within critical ranges. By controlling the rate of passage of the sulphuric anhydride the temperature of the charge is maintained between critical limits of about 40° F. to about 120° F. and preferably between 70° F. and 90° F., and the desired amount of sulphonation is secured. The time of contact varies, in general, inversely with the concentration of the reacting gas and for dilute sulphuric anhydride gas, containing say 2% sulphuric anhydride, the reaction time will be about three hours. The mixture of sulphuric anhydride and air, substantially anhydrous and substantially free from sulphuric acid, is passed into a reaction chamber. The reaction chamber is provided with cooling facilities when desirable. The substantially anhydrous sulphuric anhydride-air mixture, practically free of liquid sulphuric acid, is distributed over the area of the lower end of the reaction chamber, by means of a distributor designed to provide a multiplicity of small outlets for streams of the gaseous mixture. After the reaction has been completed the oil-insoluble sludge is separated. The supernatant mass of oil-soluble and water- and oil-soluble sulphonic acids is then transferred to the neutralizing agitator where a neutralizing agent such as hydroxides or carbonates of the alkali metals, ammonia and substituted ammonias is added. Preferably the neutralization is accomplished by the addition of an alkali such as commercial caustic soda until the oil is alkaline.

Although sulphuric anhydride in the concentration produced by the generator or converter may be used, I prefer to dilute the sulphuric anhydride to about 2% to about 7% with an anhydrous inert gas such as air. The reacting gases are passed into the oil until a proper amount of sulphuric anhydride has been absorbed or reacted.

By means of a modified embodiment of my invention it is possible to sulphonate mixtures of animal and/or vegetable fats and oils and/or coal tar products with mineral oils. Into an apparatus provided with a gas inlet and an oil inlet a suitable gas containing anhydrous sulphuric anhydride and substantially devoid of water and sulphuric acid is passed until sulphuric anhydride has been sufficiently reacted or absorbed. The passage of the anhydrous gas devoid of sulphuric acid is controlled to maintain the temperature of the mixture to be sulphonated between 40° F. and about 120° F. After the reaction has been completed the oil-insoluble material may be separated. The oil-soluble and oil-water-soluble material remaining is subsequently neutralized by the addition of alkalies such as carbonates or hydroxides of the alkali metals, ammonia or substituted ammonias. There is a broad range of ratios of animal or vegetable oils to mineral oils or coal tar products which may be employed as mixtures for use in my new process. It is preferred to sulphonate those mixtures which contain up to about 25% of animal or vegetable oils and fats and particularly mixtures containing about 2% to about 25% of animal and/or vegetable fats and oils. The oil-water-soluble sulphonates thereby produced are especially valuable for the formation of exceptionally stable emulsions suitable for use in the textile industry and other industries.

In the practical application of my invention to the industrial production of oil-in-water emulsions for use in the textile industry and as cutting oils and the like, I prefer to use a mixture of catalytically produced anhydrous sulphuric anhydride in admixture with anhydrous sulphurous anhydride, as disclosed in my copending application U. S. Serial No. 214,579.

In accordance with this disclosure I prefer to use an anhydrous gas mixture containing up to about 12%, and for optimum conditions about 5 to about 7.5%, total oxides of sulphur of which anhydrous sulphuric anhydride is the preponderant component and represents say about 90% to about 97% of the total oxides of sulphur.

I prefer to continue the sulphonation for practical purposes at a temperature of about 70° F. to about 90° F. until the absorption of bromine is substantially reduced. This may be considered as indicative of almost complete satisfaction of the unsaturated bonds of the organic material. It is my opinion at the present time that by using a gas mixture containing catalytically produced anhydrous $SO_3$ and anhydrous $SO_2$ the side chain groups of the saturates present, for example, in petroleum oil, are singed off. The sulphonated oils obtained by this preferred embodiment have a color of about 1.5 on the A. S. T. M. chart and undergo very slight oxidation.

It is my opinion that when $SO_3$ made from the catalytic oxidation of anhydrous $SO_2$ is introduced into an oil at room temperature, petroleum mono-sulphonates are formed and as a secondary reaction sulphates and sulphonates of indeterminate alkyl groups are produced. Both of these latter groups hydrolyze. In an alkaline medium the hydrolysis is much slower than in an acid medium.

Experience has proven that, as the medium increases in acidity, the hydrolysis is speeded up. Also, the hydrolysis progresses with the rise of temperature. Experience has shown that, if an emulsifiable oil in the water medium is used in contact with iron or steel, any change in the pH of the medium, leaning toward the acid, will tend to form gums and particularly organic products of iron. These iron organic impurities are gummy in their nature and interfere with the smoothly working parts of the machine, whether they are used as cutting oils or as textile oils.

Experience has also shown that, if the proper alkalinity of the medium is maintained, the gummy organic salts will not be produced at all or at the most will be produced very slowly, and recourse has been had to holding the medium, throughout its use in the arts, noticeably alkaline with inorganic alkalies such as caustic soda and caustic potash, or organic alkalies such as monoamines and diamines.

In the process of the present invention I prefer to add this excess of alkali to the soap or sulphonated oil itself in order to compensate for the running down of the emulsions with their subsequent hydrolysis in commercial work. The production of an oil for emulsifying purposes with this end in view obviates the mistakes and annoyances of adding an indefinite amount of alkali to the finished water emulsions for use in the arts.

It is well to point out specific instances of the difference between sulphonation in the method of boiling off oleum to get $SO_3$ and the $SO_3$ obtained from the catalytic oxidation of anhydrous $SO_2$. When the respective gases are introduced into a petroleum distillate under like conditions, we find that sulphonation progresses very much more rapidly, using anhydrous $SO_3$, than it does where the $SO_3$ is obtained from oleum.

In the case of $SO_3$ generated from oleum sulphonation is carried on for an extended period of time, and a product is obtained that is oil-soluble requiring about $4\frac{1}{3}\%$ to $4\frac{1}{2}\%$ caustic soda, 30° Bé., to neutralize. This, on analysis, shows approximately 1% of sulphur oxides combined with other than the oil-soluble sulphonates. In the case where $SO_3$ from catalytic oxidation of anhydrous $SO_2$ is used, it is found that about 3% to about $3\frac{1}{2}\%$ of caustic soda, 30° Bé., will be enough to neutralize the sulphonic acids. In order to get an alkaline balance, however, it has been found preferable to use 5% of caustic soda, 30° Bé., to neutralize the product which indicates that between 1.5% and 2.5% is used for neutralizing other than the oil-soluble sulphonic acids. As it is known that alkyl sulphates and sulphonates are formed, this is the explanation. When alkyl sulphates or alkyl sulphuric esters are present in a complex medium, as in sulphonated petroleum distillates, such esters are of the higher order or in other words high molecular weight. These esters of high molecular weight, made in conjunction with the sulphonates, contribute as a benefit to the emulsifying character of the oil.

It may be well to refer to Clowes [J. Phy. Chem., 20, 407-451 (1916)] in the consideration of this subject. It may be of interest that the oil globules in pure oil-in-water emulsions have a theoretical diameter in the order of $10^{-5}$ cm. (Donnau, Zeit. phys. Chem., 46, 197 [1903]).

In sulphonating in the manner described above, namely, using catalytically oxidized anhydrous $SO_3$, a progressive form of sulphonic bodies is encountered. In other words, if there is not enough soap body or sulphonate soluble in oil to lower the surface tension of the oil globule, a partial emulsion is formed in which the globules show no perceptible movement or only a perceptible movement in the order of $3 \times 10^{-4}$ Brown, Phil. Mag. 4, 161 (1928); 6, 161 (1929).

If the quantity of sulphonic bodies soluble in oil is increased the contention of Clowes is borne out in that the particle size becomes less than $4 \times 10^{-4}$ and Brownian movement results when this body of oil and soap product is emulsified.

In clear emulsions the particles should have a value less than the wave length of light, the shortest visible rays being close to $10^{-5}$ cm. I have discovered that the oil should be fortified by adding sufficient sulphonated oil-soluble bodies so that they will carry the raffinate or unsulphonated oil into an aqueous emulsion with a particle size of $0.4 \times 10^{-4}$ or less. If this product is not so fortified it is found that on emulsifying with water many globules of oil are formed having a large size, some being perhaps 200 to 300 microns, whereas, if the product in question is fortified by a sufficient amount of sulphonated bodies, the globules of oil may fall even below $1 \times 10^{-4}$. This is essential in producing a product that can be used in textile and laundry work, where the resulting oil has to be scoured out, and it plays an important part in a number of the arts.

There is a marked difference between the sulphonation of petroleum distillates by anhydrous $SO_3$ from catalytic oxidation and from $SO_3$ generated by volatilizing oleum.

Petroleum oils may be classified roughly into two classes, one containing a preponderance of aromatics and the other a preponderance of naphthenes. Under the same conditions of sulphonating with the same temperature, time and dilution with inert gas, the difference between $SO_3$ from oleum and anhydrous $SO_3$ from catalytic oxidation are spread forth herewith.

The preponderance of aromatics in an oil causes the oil to sulphonate very readily due to the fact that the aromatic constituent is built up largely from unsaturated carbon atoms whereas the oils containing a preponderance of naphthenes are mostly cyclic and must undergo a secondary reaction in respect to sulphonation.

Referring to the Oil and Gas Journal, June 27, 1935, p. 43, the following is found:

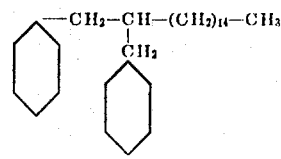

Phenyl=2 benzyl heptadecane ($C_{30}H_{46}$) is a synthetic aromatic oil, viz., 100° F., 164.3 sec. Saybolt Universal, that may be taken as an example.

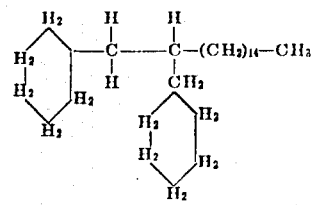

Cyclohexyl—2 hexahydrobenzylheptadecane ($C_{30}H_{58}$) is a synthetic cyclic oil (naphthenic), viz., 100° F., 146.2 sec. Saybolt Universal, that may be taken as an example.

If hydrolysis plays an important part in the equation, as I think it may, my theories are borne out in part by the above comparison. It is known that sulphonation of the ring or aromatics gives sulphonates extremely hard to hydrolyze, whereas it appears from the following references that there is some doubt as to oils of naphthenic origin sulphonating per se.

See, for example, Vuiborova, Azerb. Neft. Phoz. 1932, 7, 79; Chem. Abs. 1932, 26, 5740; Novikov-Vakulenko, Azerb. Neft. Khoz., 1932, 11, 58; Chem. Abs. 1933, 27, 1492.

Pyhaha, Petroleum, 1908, 3, 1313; J. S. C. I. 1908, 27, 1054; see also Nuishetravskii Neft. Khoz. 1932, 22, 241; Chem. Abs. 1932, 26, 4450.

Gurwitsch-Moore "The Scientific Principles of Petroleum Technology," D. Van Nostrand Co., New York, 1932, 127.

The oils set forth in this article are synthetic oils but they give a good explanation of my new process of sulphonation. According to the references, the sulphonation may not enter the ring of the cyclic bodies per se, but first dehydrogenates those bodies forming vulnerable carbon atoms which are then susceptible to sulphonation.

In practical experience an aromatic oil is sulphonated to 4½% of requirement of neutrality expressed as 30° Bé. caustic. On the other hand, the naphthenes in the oil do not sulphonate to above 3.2% caustic requirements to neutralize. Both the aromatics and naphthenes show an individual solubility coefficient whereby a definite amount of oil-soluble sulphonate formed will go into solution. The aromatic oils take up more of the oil-soluble sulphonic bodies than do the naphthenic oils. The main feature is that due to the catalytic oxidation of anhydrous $SO_2$ to $SO_3$ in accordance with the principles of the present invention sulphonation progresses further than when $SO_3$ is generated from oleum. Indications are that each of them, aromatics or naphthenes, produces alkyl sulphonic esters and alkyl sulphates but in differing degree. It is evident that in the sulphonation in accordance with the principles of the present invention the alkyl sulphates or the alkyl sulphonic esters play a conspicuous part in aiding the emulsification of the oil body. Whether or not they increase the solubility of the oil-soluble constituent or add some other factor is not known, but I have found that hydrocarbons can be sulphonated more readily and a higher degree of sulphonation can be obtained using the anhydrous $SO_3$ generated from catalytic oxidation of $SO_2$ than by the use of $SO_3$ volatilized from oleum.

In the dehydrogenation of the cyclic oils or saturated oils of the naphthenic variety, not only the alkyl sulphonic esters and the alkyl sulphonates are formed, but some water is necessarily formed during the reaction.

Thus I have been able to produce dispersants in which the sulphur united to organic atoms is in excess of the sulphur united to inorganic atoms. I have found that such an excess even though it be of the order of about 0.25% is effective in providing dispersants capable of producing oil-in-water dispersions in which the size of the oil globules is such that the oil globules display Brownian movement. Such dispersants usually contain alkyl sulphonic esters, alkyl esters of alkyl sulphuric acids, alkyl sulphonates and alkali metal sulphates. However, to obtain my new results it is necessary that the alkyl sulphonic esters, alkyl esters of alkyl sulphuric acids and alkyl sulphonates be in excess of the content of alkaline metal sulphates.

Although the present invention has been described in conjunction with certain preferred embodiments it is to be understood that certain variations and modifications may be made as those skilled in the art will readily understand. Such variations and modifications are to be considered within the scope of the specification and the purview of the appended claims.

The present application is a continuation in part of my copending application U. S. Serial No. 164,650, relating to a Method for producing oil-water-soluble sulphonic derivatives from liquid hydrocarbons, filed September 20, 1937.

I claim:

1. As a new article of manufacture, an oil-soluble and water-soluble material having organic sulphur in excess of inorganic sulphur and capable of forming aqueous suspensions of water-insoluble oils wherein the globules of oil have diameters not greater than $4 \times 10^{-4}$ cm., said material comprising sulphonate and sulphate derivatives of liquid hydrocarbons contained in liquid organic substances selected from the group consisting of mineral oils, mineral oil fractions, and mixtures of at least one of mineral oils and mineral oil fractions with at least one of vegetable and animal oils and coal tar products, said derivatives being formed by reaction of the liquid hydrocarbons with a substantially anhydrous gaseous mixture containing anhydrous sulphuric anhydride and anhydrous sulphurous anhydride.

2. As a new article of manufacture, an oil-soluble and water-soluble material containing alkyl sulphonic esters, alkyl esters of alkyl sulphuric acids and alkyl sulphonates in excess of the amount of alkali metal sulphates therein and capable of forming oil-in-water emulsions wherein the oil particles display Brownian movement, said material comprising sulphonate and sulphate derivatives of liquid hydrocarbons contained in liquid organic substances selected from the group consisting of mineral oils, mineral oil fractions, and mixtures of at least one of mineral oils and mineral oil fractions with at least one of vegetable and animal oils and coal tar products, said derivatives being formed by reaction of the liquid hydrocarbons with a substantially anhydrous gaseous mixture containing anhydrous sulphuric anhydride and anhydrous sulphurous anhydride.

3. As a new article of manufacture, an emulsifying agent containing alkyl sulphonic esters, alkyl esters of alkyl sulphuric acids and alkyl sulphonates in excess of the amount of alkali metal sulphates therein and being capable of forming oil-in-water emulsions wherein the globules of oil have diameters not greater than $4 \times 10^{-4}$ cms., said emulsifying agent comprising sulphonate and sulphate derivatives of liquid hydrocarbons, including sulphonated liquid cyclic compounds, contained in a liquid oil body selected from the group consisting of mineral oils, mineral oil fractions, and mixtures of at least one of mineral oils and mineral oil fractions with at least one of vegetable and animal oils and coal tar products, said derivatives being formed by reaction of the liquid hydrocarbons with a substantially anhydrous gaseous mixture containing anhydrous sulphuric anhydride and anhydrous sulphurous anhydride.

4. As a new article of manufacture, an emulsifying agent containing alkyl sulphonic esters, alkyl esters of alkyl sulphuric acids and alkyl sulphonates, said agent being substantially free from alkali metal sulphates and being capable of forming oil-in-water emulsions wherein the globules of oil have diameters not greater than $4 \times 10^{-4}$ cms., said emulsifying agent comprising sulphonate and sulphate derivatives of liquid hydrocarbons, including sulphonated liquid cyclic compounds, contained in a liquid oil body selected from the group consisting of mineral oils, mineral oil fractions, and mixtures of at least one of mineral oils and mineral oil fractions with at least one of vegetable and animal oils and coal tar products, said emulsifying agent being formed by reaction of the liquid hydrocarbons with a substantially anhydrous gaseous mixture containing anhydrous sulphurous anhydride and anhydrous sulphuric anhydride, produced by catalytic oxidation of sulphurous anhydride, and without extraction by solvents in which inorganic sulphates are insoluble.

5. As a new article of manufacture, an oil-soluble and water-soluble material containing alkyl sulphonic esters, alkyl esters of alkyl sulphuric acids and alkyl sulphonates in excess of the amount of alkali metal sulphates therein and capable of forming oil-in-water emulsions wherein the globules of oil have diameters not greater than $4 \times 10^{-4}$ cm., said material comprising sulphonate and sulphate derivatives of liquid hydrocarbons, including sulphonated liquid cyclic compounds, contained in an oil body selected from the group consisting of mineral oils, mineral oil fractions, and mixtures of at least one of mineral oils and mineral oil fractions with at least one of vegetable and animal oils and coal tar products, said derivatives being formed by treating the liquid hydrocarbons with a substantially anhydrous gaseous mixture containing up to about 12% anhydrous oxides of sulphur, said anhydrous oxides of sulphur consisting of a preponderance of anhydrous sulphuric anhydride and smaller amounts of anhydrous sulphurous anhydride, to form oil-soluble and oil-insoluble sulphonic derivatives of said hydrocarbons, and separating said oil-soluble derivatives from said oil-insoluble derivatives.

6. As a new article of manufacture, an emulsifying agent containing alkyl sulphonic esters, alkyl esters of alkyl sulphuric acids and alkyl sulphonates in excess of the amount of alkali metal sulphates therein and capable of forming oil-in-water emulsions wherein the globules of oil have diameters not greater than $4 \times 10^{-4}$ cm., said emulsifying agent comprising sulphonate and sulphate derivatives of liquid hydrocarbons, including sulphonated liquid cyclic compounds, of an oil body selected from the group consisting of mineral oils, mineral oil fractions, and mixtures of at least one of mineral oils and mineral oil fractions with at least one of vegetable and animal oils and coal tar products, and said emulsifying agent being characterized by properties resulting from treating the liquid hydrocarbons at a temperature of about 70 to about 90° F. with a substantially anhydrous gaseous mixture containing up to about 12% anhydrous oxides of sulphur in a volume ratio of about 90 to about 97 parts of anhydrous sulphuric anhydride to about 10 to about 3 parts of anhydrous sulphurous anhydride to form oil-soluble and oil-insoluble sulphonic compounds with unattacked residual oil, said residual oil containing the oil-soluble sulphonic compounds, separating said residual oil together with said oil-soluble sulphonic compounds from the oil-insoluble compounds, and neutralizing said oil-soluble sulphonic compounds.

THOMAS C. OLIVER.